(12) United States Patent
Takeno et al.

(10) Patent No.: US 12,198,513 B2
(45) Date of Patent: Jan. 14, 2025

(54) MONITORING DEVICE AND MONITORING METHOD

(71) Applicant: Toshiba Tec Kabushiki Kaisha, Tokyo (JP)

(72) Inventors: Yuishi Takeno, Numazu Shizuoka (JP); Keita Yamazaki, Mishima Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/443,290

(22) Filed: Feb. 15, 2024

(65) Prior Publication Data

US 2024/0185691 A1 Jun. 6, 2024

Related U.S. Application Data

(63) Continuation of application No. 17/840,539, filed on Jun. 14, 2022, now abandoned.

(30) Foreign Application Priority Data

Nov. 25, 2021 (JP) ................................. 2021-191259

(51) Int. Cl.
*H04N 7/18* (2006.01)
*G06V 10/40* (2022.01)
(Continued)

(52) U.S. Cl.
CPC ............. *G07G 3/003* (2013.01); *G06V 10/40* (2022.01); *G06V 20/60* (2022.01); *G06V 40/10* (2022.01);
(Continued)

(58) Field of Classification Search
USPC ........................................................ 348/150
See application file for complete search history.

(56) References Cited

U.S. PATENT DOCUMENTS

| 7,909,248 B1 | 3/2011 | Goncalves |
| 9,390,596 B1 | 7/2016 | Todeschini |

(Continued)

FOREIGN PATENT DOCUMENTS

| JP | 5716783 B2 | 5/2015 |
| JP | 6972398 B2 | 11/2021 |
| KR | 20210066219 A | 6/2021 |

OTHER PUBLICATIONS

Office Action mailed Mar. 18, 2024, in corresponding Korean Patent Application No. 11-2022-0097850, 11 pages (with Translation).

*Primary Examiner* — Nigar Chowdhury
(74) *Attorney, Agent, or Firm* — Kim & Stewart LLP

(57) ABSTRACT

A monitoring device for monitoring a customer operating a checkout terminal in a store, includes a network interface configured to communicate with the checkout terminal configured to perform checkout processing and an attendant terminal, a camera interface through which an image captured by a camera is received, the camera being installed so as to image the customer operating the checkout terminal, and a processor configured to, upon receipt of a first command indicating that the checkout processing has been started from the checkout terminal, begin monitoring of the image captured by the camera, upon detection of presence of the customer in the image, acquire feature information representing features of the customer from the image, and upon detection of absence of the customer in the image after the feature information is acquired, control the network interface to output to the attendant terminal an alert signal with the acquired feature information.

20 Claims, 10 Drawing Sheets

(51) Int. Cl.
    *G06V 20/60*     (2022.01)
    *G06V 40/10*     (2022.01)
    *G07G 3/00*     (2006.01)
    *G08B 13/196*     (2006.01)

(52) U.S. Cl.
    CPC .......... *G08B 13/196* (2013.01); *H04N 7/181* (2013.01); *H04N 7/188* (2013.01)

(56) References Cited

U.S. PATENT DOCUMENTS

| | | | |
|---|---|---|---|
| 9,589,433 | B1 | 3/2017 | Thramann |
| 10,496,827 | B1 * | 12/2019 | Ridner ................ G06F 21/6245 |
| 11,443,598 | B2 | 9/2022 | Bronicki |
| 2003/0018897 | A1 | 1/2003 | Bellis |
| 2010/0114746 | A1 | 5/2010 | Bobbitt et al. |
| 2014/0338987 | A1 | 11/2014 | Kobres |
| 2016/0023675 | A1 | 1/2016 | Hannah |
| 2016/0379219 | A1 | 12/2016 | Ariga |
| 2017/0251183 | A1 | 8/2017 | Crooks |
| 2018/0075428 | A1 | 3/2018 | Shimura |
| 2018/0096567 | A1 | 4/2018 | Farrow |
| 2018/0208970 | A1 | 7/2018 | Jiang |
| 2018/0240090 | A1 | 8/2018 | Yokoyama |
| 2018/0300557 | A1 * | 10/2018 | Rodenas .......... G08B 13/19613 |
| 2018/0350144 | A1 * | 12/2018 | Rathod .............. G06Q 20/3224 |
| 2018/0365666 | A1 | 12/2018 | Kakino |
| 2019/0043003 | A1 | 2/2019 | Fisher |
| 2019/0220692 | A1 | 7/2019 | Wu |
| 2019/0303946 | A1 | 10/2019 | Yamada |
| 2019/0311370 | A1 | 10/2019 | Sekine |
| 2019/0371134 | A1 | 12/2019 | Chen |
| 2020/0065793 | A1 | 2/2020 | Kakino |
| 2020/0116535 | A1 * | 4/2020 | Craig .................... G01S 5/0027 |
| 2020/0387866 | A1 | 12/2020 | Francis |
| 2020/0409449 | A1 | 12/2020 | Rambler |
| 2021/0049370 | A1 | 2/2021 | Hou |
| 2021/0192486 | A1 | 6/2021 | Uchimura |
| 2021/0241249 | A1 | 8/2021 | DeBardlebon |
| 2021/0272086 | A1 | 9/2021 | Buibas |
| 2021/0287013 | A1 | 9/2021 | Carter |
| 2021/0319420 | A1 | 10/2021 | Yu |
| 2021/0375104 | A1 | 12/2021 | Handshaw |
| 2022/0067689 | A1 | 3/2022 | Guack |
| 2022/0147341 | A1 | 5/2022 | Thakore |

* cited by examiner

MONITORING DEVICE AND MONITORING METHOD

CROSS-REFERENCE TO RELATED APPLICATION

This application is a continuation of U.S. patent application Ser. No. 17/840,539, filed Jun. 14, 2022, which is based upon and claims the benefit of priority from Japanese Patent Application No. 2021-191259, filed Nov. 25, 2021, the entire contents of which are incorporated herein by reference.

FIELD

Embodiments described herein relate generally to a monitoring device, a monitoring method, and a non-transitory computer readable medium storing a program causing a computer to execute a monitoring method.

BACKGROUND

There are checkout systems of a self-service type with which a customer himself or herself performs the operations necessary for commodity registration and a sales transaction settlement (payment) after commodity registration. With the checkout system of this type, a customer may leave a store before completing checkout processing. Therefore, there has been a technique adopted for sensing or detecting whether a customer is present in a checkout area during checkout processing, and then issuing an alert if a customer leaves the checkout area before the checkout processing is completed.

With such related art, a store clerk can be made aware that a customer left the checkout area before completing checkout processing. However, if there are two or more customers who leave the checkout area at about the same time as the store clerk is alerted, it is not easy for the clerk to identify which customer is the one who failed to complete checkout processing.

DETAILED DESCRIPTION

One or more embodiments provide a monitoring device that can easily specify a customer who left a checkout area in a store before completing checkout processing.

According to an embodiment, a monitoring device for monitoring a customer operating a checkout terminal in a store is provided. The monitoring device includes a network interface configured to communicate with the checkout terminal configured to perform checkout processing and an attendant terminal. The monitoring device includes a camera interface through which an image captured by a camera is received. The camera is installed so as to image the customer operating the checkout terminal. The monitoring device includes a processor configured to, upon receipt of a first command indicating that the checkout processing has been started from the checkout terminal, begin monitoring the image captured by the camera, upon detection of presence of the customer in the image, acquire feature information representing features of the customer from the image, and upon detection of absence of the customer in the image after the feature information is acquired, control the network interface to output to the attendant terminal an alert signal with the acquired feature information.

Certain example embodiments relating to a customer monitoring device are explained below with reference to the drawings. The particular examples described concern a checkout system of a self-service type that can be introduced at a retail store such as a supermarket. In a self-service type checkout system, a customer can complete a transaction by performing commodity registration and checkout processing by himself or herself, generally without intervention of a store clerk or the like.

First Embodiment

First, a checkout system 100 according to a first embodiment is explained with reference to FIGS. 1 to 6.

Figure 1:
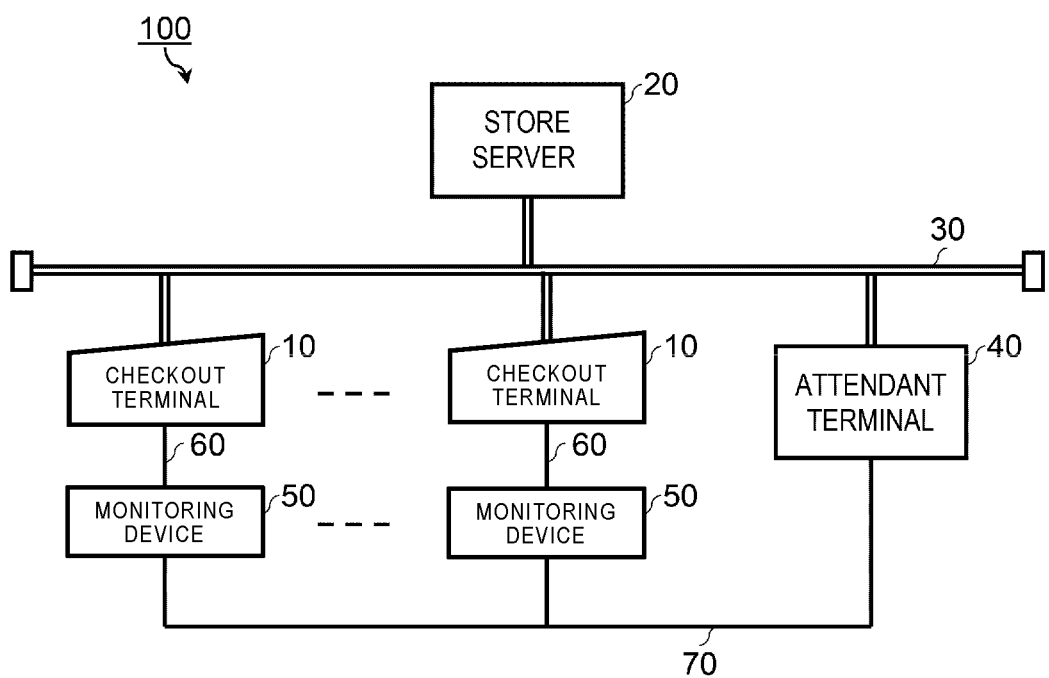
FIG. 1 is a schematic diagram illustrating a checkout system of a self-service type.

FIG. 1 is a schematic diagram illustrating the checkout system 100 of a self-service type. The checkout system 100 includes a plurality of checkout terminals 10 and a store server 20. In the checkout system 100, the checkout terminals 10 and the store server 20 are connected by a communication network 30 such as a LAN (Local Area Network). In the checkout system 100, an attendant terminal 40 for monitoring by a store clerk is also connected to the communication network 30.

The checkout terminals 10 are installed in a checkout are in a store. Customers who have finished shopping operate the checkout terminals 10 for checkout. A customer who has put purchased commodities in a shopping basket or the like in a selling floor where commodities are displayed moves to the checkout area, operates the checkout terminal 10, and performs commodity registration and checkout processing by himself or herself. The store server 20 communicates with the checkout terminal 10 to complete the transaction. The attendant terminal 40 is installed in a monitoring area near an exit of the checkout area and displays, for example, a list of purchased commodities registered in each of the checkout terminals 10 on a display device. If an error occurs in the checkout terminal 10, the attendant terminal 40 displays information concerning the error. A store clerk present in the monitoring area checks the checkout area based on the error information informed by the attendant terminal 40. In FIG. 1, one attendant terminal 40 is illustrated. However, a plurality of attendant terminals 40 may be connected to the communication network 30.

The checkout system further includes a plurality of monitoring devices 50 each connected to a corresponding one of the checkout terminals 10. The monitoring device 50 may be installed outside of the checkout terminal 10 or may be embedded in the checkout terminal 10. In this example, the monitoring device 50 is provided outside of the checkout terminal 10, and the checkout terminal 10 and the monitoring device 50 are connected to each other by a signal cable 60.

The monitoring device 50 is a device for monitoring a movement of a customer, who operates the checkout terminal 10 corresponding to the monitoring device 50. Specifically, the monitoring device 50 monitors the customer who is operating the checkout terminal 10 corresponding to the monitoring device 50 and performing checkout processing and notifies an alert if the customer has left the checkout area before completing the checkout processing. A notification destination of the alert is, for example, the attendant terminal 40. The monitoring devices 50 are connected to the attendant terminal 40 by a signal cable 70 and outputs an alert signal to the attendant terminal 40.

Figure 2:
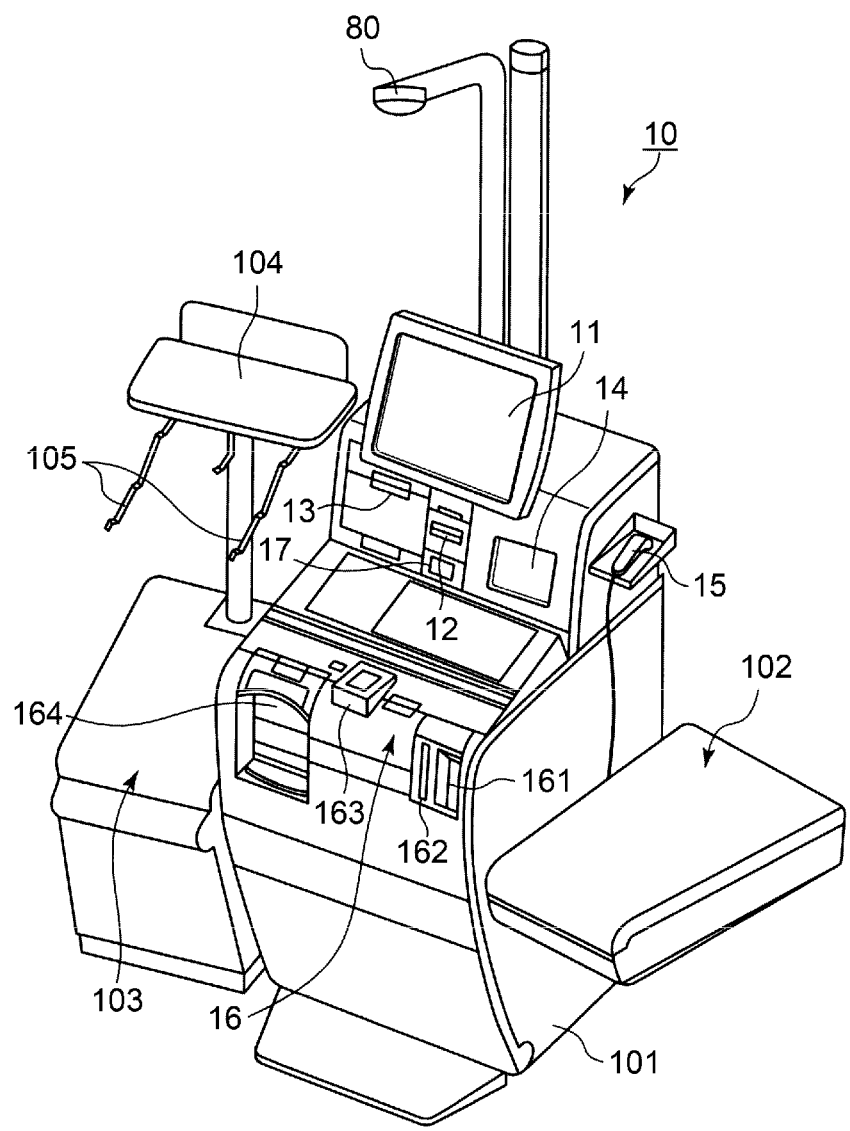
FIG. 2 is a perspective view illustrating an exterior of a checkout terminal.
Figure 3:
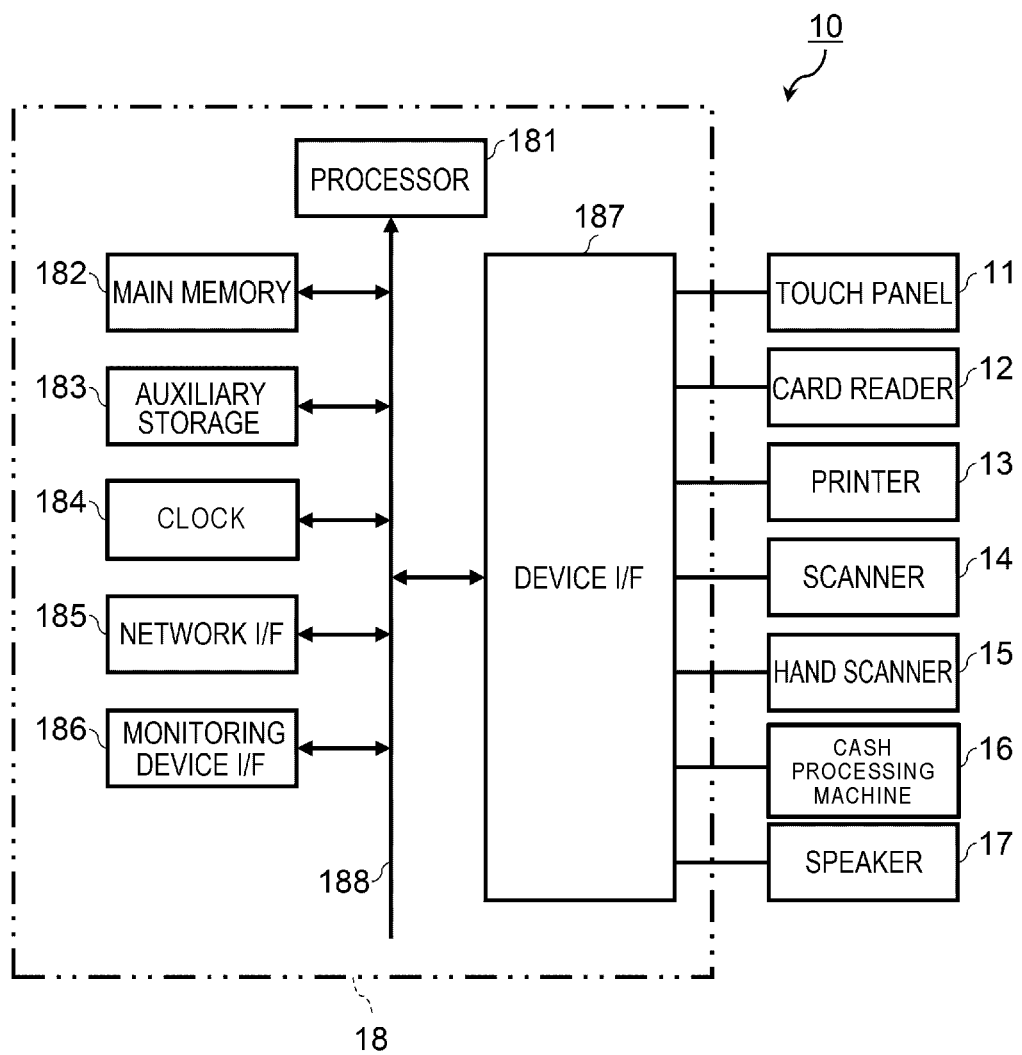
FIG. 3 is a hardware block diagram of a checkout terminal.

FIG. 2 is a perspective view illustrating an exterior of the checkout terminal 10. FIG. 3 is a hardware block diagram of the checkout terminal 10. A main configuration of the checkout terminal 10 is explained below with reference to FIGS. 2 and 3.

As illustrated in FIG. 2, the checkout terminal 10 includes a main body 101 and a first commodity placing table 102 and a second commodity placing table 103 disposed on the left and the right of the main body 101. The first commodity placing table 102 disposed on the right side of the main body 101 is a place for a customer to place purchased commodities before registration. The purchased commodities before registration are usually stored in a shopping basket and placed on the first commodity placing table 102. The purchased commodities before registration may be located above the first commodity placing table 102 in a state in which the purchased commodities before registration are stored in a shopping cart.

The second commodity placing table 103 disposed on the left side of the main body 101 is a place for the customer to place the purchased commodities after registration. The purchased commodities after registration are stored in, for example, a shopping bag (a register bag, a reusable shopping bag, or the like) placed on the second commodity placing table 103. The purchased commodities after registration may be directly placed on the second commodity placing table 103. In FIG. 2, a temporary placing table 104 is provided above the second commodity placing table 103 via a column. The temporary placing table 104 is, for example, a table for temporarily placing commodities before storing the commodities in a shopping bag. Two holding arms 105 separated to the left and the right are attached to the temporary placing table 104. The customer can hang the shopping bag on the holding arms 105.

The main body 101 includes a touch panel 11, a card reader 12, a printer 13, a scanner 14, a hand scanner 15, a cash processing machine 16, and a speaker 17 as input and output devices.

The touch panel 11 includes a display functioning as a display device and a touch sensor functioning as an input device. The display displays various kinds of screen information such as a checkout start screen, a registration details screen, a payment method selection screen, and a checkout screen. The checkout start screen is a screen for receiving a checkout start operation. A start key for instructing the checkout start operation is disposed on the checkout start screen. A customer who starts registration of purchased commodities touches the start key. If the touch sensor detects that the start key is touched, a processor 181 (see FIG. 3) of the checkout terminal 10 controls the display to shift the screen from the checkout start screen to the registration details screen.

The registration details screen is a screen for displaying detailed information such as commodity names, prices, and a total amount of registered purchased commodities. A payment key for proceeding to payment for the registered purchased commodities is disposed on the registration details screen. A customer who has finished the registration of purchased commodities touches the payment key. If the touch sensor detects that the payment key is touched, the processor 181 of the checkout terminal 10 controls the display to shift the screen from the registration details screen to the payment method selection screen.

The payment method selection screen is a screen for receiving a selection input for a payment method such as a cash payment, a credit card payment, or an electronic money payment. A cash key for instructing the cash payment, a credit key for instructing the credit card payment, an electronic money key for instructing the electronic money payment, and the like are disposed on the payment method selection screen. For example, a customer desiring the cash payment touches the cash key. If the touch sensor detects that the cash key is touched, the processor 181 of the checkout terminal 10 controls the display to shift the screen from the payment method selection screen to the checkout screen. The checkout screen is a screen for displaying a total amount of a transaction, a deposit amount of cash, a change amount, and the like.

The card reader 12 reads data recorded in a card medium such as a credit card, an electronic money card, or a point card. If the card medium is a magnetic card, the card reader 12 is a magnetic card reader. If the card medium is an IC card, the card reader 12 is an IC card reader. The checkout terminal 10 may include one or both of the magnetic card reader and the IC card reader as the card reader 12. The card reader 12 may be a card reader writer including a function of writing data into a card.

The printer 13 prints data relating to a purchase receipt, a credit card slip, or the like on receipt paper. The receipt paper on which various data are printed by the printer 13 is cut by a cutter and dispensed from a receipt dispensing port. The printer 13 is, for example, a thermal printer or a dot impact printer.

The scanner 14 and the hand scanner 15 read information for identifying a commodity. In this embodiment, the scanner 14 and the hand scanner 15 read a barcode attached to a commodity as information for identifying the commodity. The scanner 14 optically reads the barcode of the commodity held over a reading window such that the barcode attached to the commodity is opposed to the reading window. The hand scanner 15 is held and operated by a customer. The hand scanner 15 optically reads the barcode when brought close to the barcode attached to the commodity. The scanner 14 and the hand scanner 15 may read information for identifying a commodity from another code other than a barcode, e.g., a two-dimensional code.

The cash processing machine 16 receives and dispenses cash. The cash processing machine 16 includes a bill insertion port 161, a bill discharging port 162, a coin insertion port 163, and a coin discharging port 164. The cash processing machine 16 receives bills inserted via the bill insertion port 161. The cash processing machine 16 discharges bills as change from the bill discharging port 162. The cash processing machine 16 receives coins inserted via the coin insertion port 163. The cash processing machine 16 discharges coins as change from the coin discharging port 164.

The speaker 17 outputs warning or alert sounds, voice messages, or the like.

A camera 80 is provided above the main body 101. The camera 80 images a customer who is operating the checkout terminal 10. As illustrated in FIG. 2, the display of the touch panel 11, the card insertion port of the card reader 12, the receipt dispensing port of the printer 13, the reading window of the scanner 14, and the bill insertion port 161, the bill discharging port 162, the coin insertion port 163, and the coin discharging port 164 of the cash processing machine 16 are disposed along one surface (hereinafter referred to as front surface) of the main body 101. Accordingly, the customer stands to face the front surface of the main body 101 and operates the checkout terminal 10. The camera 80 images substantially the whole body of the customer from above. Therefore, the head, the face, both the shoulders, both the arms, the chest, the abdomen, and the like of the customer are imaged by the camera 80.

As illustrated in FIG. 3, the checkout terminal 10 includes a control circuit 18 including a processor 181, a main memory 182, an auxiliary storage device 183, a clock 184, a network interface (I/F) 185, a monitoring device interface (I/F) 186, a device interface (I/F) 187, and a system transmission line 188. The system transmission line 188 includes an address bus, a data bus, a control signal line, and the like.

The processor 181, the main memory 182, the auxiliary storage device 183, the clock 184, the network interface 185, the monitoring device interface 186, and the device interface 187 are connected to each other by the system transmission line 188 such that data signals are exchanged therebetween. In the checkout terminal 10, the touch panel 11, the card reader 12, the printer 13, the scanner 14, the hand scanner 15, the cash processing machine 16, and the speaker 17 explained above are connected to the device interface 187. Devices that can be connected to the checkout terminal 10 are not limited to the devices shown in FIG. 3. Any device may be added to the checkout terminal 10 or one or more of the devices shown in FIG. 3 may be omitted.

The processor 181 controls the other components of the checkout terminal 10 in order to perform various functions thereof according to an operating system and one or more application programs. The processor 181 is, for example, a CPU (Central Processing Unit).

The main memory 182 includes a nonvolatile memory region and a volatile memory region. The nonvolatile memory region of the main memory 182 stores the operating system and/or the application programs. In the nonvolatile and/or volatile memory region, data necessary for the processor 181 to execute processing for controlling the components of the checkout terminal 10 is stored. The volatile memory region is used as a work area where data is temporarily stored by the processor 181. The nonvolatile memory region is, for example, a ROM (Read Only Memory). The volatile memory region is, for example, a RAM (Random Access Memory).

The auxiliary storage device 183 is, for example, an EEPROM (Electric Erasable Programmable Read-Only Memory), an HDD (Hard Disk Drive), or an SSD (Solid State Drive). The auxiliary storage device 183 stores data used by the processor 181 in performing various kinds of processing, data generated by the processor 181, and the like. The auxiliary storage device 183 can store the application programs.

The clock 184 is a clock circuit that maintains a date and time. The processor 181 acquires, as present date and time, the date and the time from the clock 184.

The network interface 185 performs data communication with the store server 20 and the attendant terminal 40 connected via the communication network 30.

The monitoring device interface 186 is connected to the monitoring device 50 via the signal cable 60. The monitoring device interface 186 performs data communication with the monitoring device 50.

Figure 4:
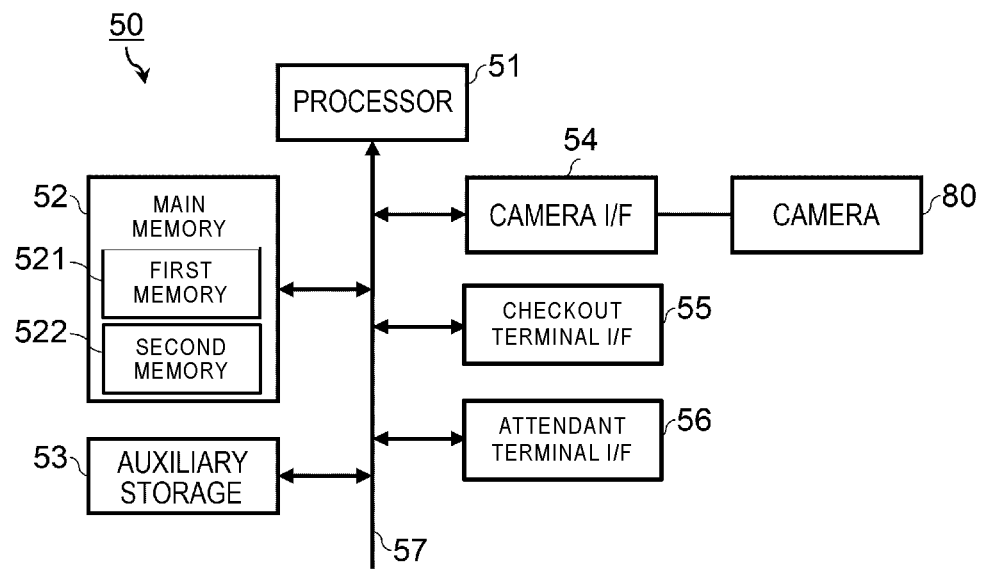
FIG. 4 is a hardware block diagram of a monitoring device according to a first embodiment.

FIG. 4 is a hardware block diagram of the monitoring device 50. The monitoring device 50 includes a processor 51, a main memory 52, an auxiliary storage device 53, a camera interface (I/F) 54, a checkout terminal interface (I/F) 55, an attendant terminal interface (I/F) 56, and a system transmission line 57. The system transmission line 57 includes an address bus, a data bus, a control signal line, and the like.

The processor 51, the main memory 52, the auxiliary storage device 53, the camera interface 54, the checkout terminal interface 55, and the attendant terminal interface 56 are connected to each other by the system transmission line 57 such that data signals are exchanged therebetween.

The processor 51 controls the other components of the monitoring device 50 in order to perform various functions thereof according to an operating system and one or more application programs. The processor 51 is, for example, a CPU.

The main memory 52 includes a nonvolatile memory region and a volatile memory region. The nonvolatile memory region of the main memory 52 stores the operating system and/or the application programs. In the nonvolatile and/or volatile memory region, data necessary for the processor 51 to execute processing for controlling the components of the monitoring device 50 is stored. The volatile memory region is used as a work area where data is temporarily stored by the processor 51. The nonvolatile memory region is, for example, a ROM. The volatile memory region is, for example, a RAM.

The auxiliary storage device 53 is, for example, an EEPROM, a HDD, or an SSD. The auxiliary storage device 53 stores data used by the processor 51 in performing various kinds of processing, data generated by the processor 51, and the like. The auxiliary storage device 53 can store the application programs.

The camera interface 54 is connected to the camera 80 attached to the checkout terminal 10 corresponding to the monitoring device 50. The camera interface 54 outputs a control signal for controlling the camera 80 to the camera 80. The camera 80 performs an imaging operation according to the control signal. The camera interface 54 takes in image data captured by the camera 80. The camera interface 54 may be a network interface connected to the camera 80 via a wired or wireless network.

The checkout terminal interface 55 is connected to the checkout terminal 10 via the signal cable 60. The checkout terminal interface 55 performs data communication with the checkout terminal 10. The checkout terminal interface 55 may be a network interface connected to the checkout terminal 10 via a wired or wireless network.

The attendant terminal interface 56 is connected to the attendant terminal 40 via the signal cable 70. The attendant terminal interface 56 performs data communication with the attendant terminal 40. The attendant terminal interface 56 may be a network interface connected to the attendant terminal 40 via a wired or wireless network. Two or more of the camera interface 54, the checkout terminal interface 55, and the attendant terminal interface 56 may be integrated into one or more interfaces.

The monitoring device 50 having such a configuration uses a part of the volatile memory region in the main memory 52 as a region of a first memory 521 and a second memory 522. Uses of the first memory 521 and the second memory 522 are explained below.

Figure 5:
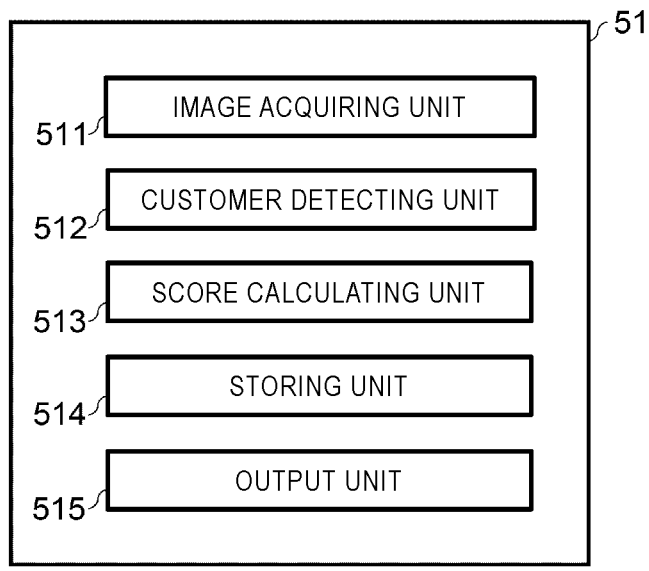
FIG. 5 is a functional block diagram of a monitoring device according to a first embodiment.

In the monitoring device 50, as illustrated in FIG. 5, the processor 51 operates as an image acquiring unit 511, a customer detecting unit 512, a score calculating unit 513, a storing unit 514, and an output unit 515 to perform various functions of the monitoring device 50.

The image acquiring unit 511 performs a function of sequentially acquiring, for each of frames, image data captured by the camera 80 connected via the camera interface 54.

The customer detecting unit 512 performs a function of detecting a customer who is performing checkout processing using the checkout terminal 10. The customer detecting unit 512 detects the customer based on, for example, an image captured by the camera 80 and acquired by the image acquiring unit 511. The customer detecting unit 512 detects the customer by, for example, extracting skeleton information of the customer from the captured image using a skeleton estimation technique that utilizes artificial intelligence (AI).

The score calculating unit 513 performs a function of calculating a posture score of the customer. The score calculating unit 513 calculates the posture score based on, for example, the skeleton information of the customer extracted by the skeleton estimation technique in the customer detecting unit 512. For example, the score calculating unit 513 scores parts of a body forming a skeleton and calculates the posture score. The parts of the body include the right eye, the left eye, the right ear, the left ear, the nose, the mouth, the neck, the right shoulder, the left shoulder, the right elbow, the left elbow, the right wrist, the left wrist, the right waist, the left waist, the right knee, the left knee, the right ankle, and the left ankle. The score calculating unit 513 sets, for example, a total number of parts that have been successfully extracted from the captured image as the posture score. The score calculating unit 513 may weigh some particular parts such as the eyes and the nose in specifying the customer and calculate the posture score. If a line segment, which is the axis of the body, connecting the middle point between the right shoulder and the left shoulder and the middle point between the right waist and the left waist tilts to the near side when viewed from above, that is, if the customer is looking down, since the parts of the face are not shown in the captured image, the score calculating unit 513 may sets the posture score to decrease.

The storing unit 514 performs a function of, for example, if the skeleton information of the customer is extracted from the captured image using the skeleton estimation technique by the customer detecting unit 512, storing the skeleton information in the first memory 521. The first memory 521 is capable of storing a predetermined number of pieces of skeleton information in time series. If the predetermined number of pieces of skeleton information are already stored in the first memory 521, the storing unit 514 stores in the first memory 521 new skeleton information after deleting the oldest skeleton information.

The storing unit 514 also performs a function of storing in the second memory 522 a maximum value of the posture score calculated in the score calculating unit 513 together with data of the captured image for each frame corresponding to the posture score. If the posture score is the maximum value, it can be considered that a large number of pieces of information that can specify the customer detected by the customer detecting unit 512 are included in the captured image corresponding to the posture score. That is, the data of the captured image corresponding to the posture score having the maximum value can be information representing the features of the customer. Thus, the score calculating unit 513 and the storing unit 514 can acquire the information representing the features of the customer.

The output unit 515 performs a function of, if the customer is no longer detected by the customer detecting unit 512 before the checkout processing in the checkout terminal 10 ends, outputting an alert signal. The alert signal includes the data of the captured image, which is the information stored in the second memory 522, that is, the information representing the features of the customer. For example, the alert signal is output to the attendant terminal 40 via the signal cable 70.

All of the functions of the image acquiring unit 511, the customer detecting unit 512, the score calculating unit 513, the storing unit 514, and the output unit 515 are performed as information processing executed by the processor 51 according to a customer monitoring program.

The customer monitoring program is a type of the application programs stored in the main memory 52 or the auxiliary storage device 53. A method of installing the customer monitoring program in the main memory 52 or the auxiliary storage device 53 is not particularly limited. The customer monitoring program can be installed in the main memory 52 or the auxiliary storage device 53 from a non-transitory computer readable recording medium or via a network. A form of the recording medium may be any form as long as the recording medium can store programs like a CD-ROM or a memory card and can be read by the monitoring device 50.

Figure 6:
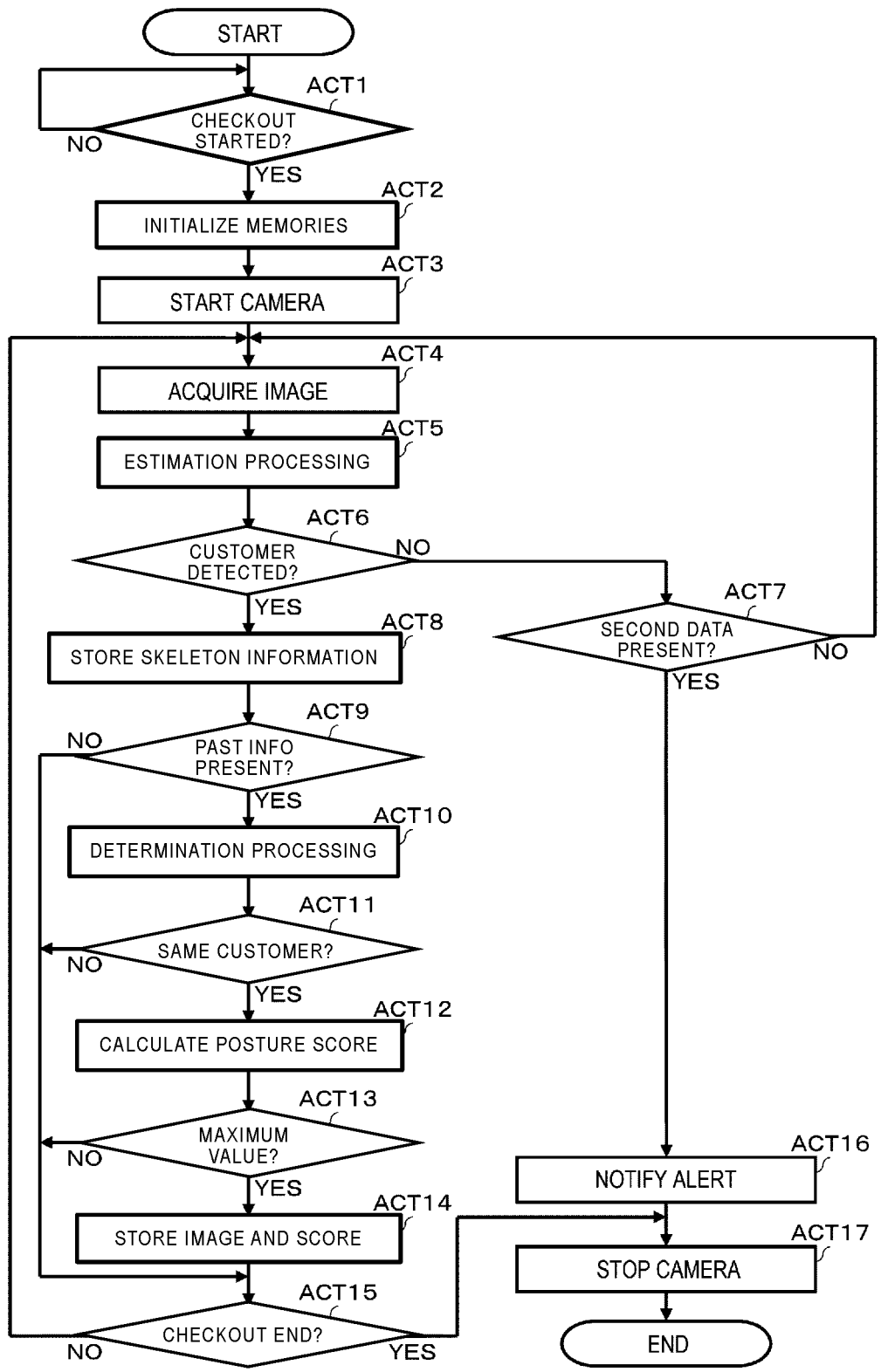
FIG. 6 is a flowchart of information processing executed by a monitoring device according to a first embodiment.

FIG. 6 is a flowchart of the information processing executed by the processor 51 of the monitoring device 50 according to the customer monitoring program. A main procedure performed by the monitoring device 50 is explained below with reference to FIG. 6. The procedure explained below is an example. The procedure can be changed as appropriate if the same effects can be achieved.

As illustrated in FIG. 6, in ACT 1, the processor 51 waits for a checkout start command. If the start key displayed on the checkout start screen of the checkout terminal 10 corresponding to the monitoring device 50 is touched, the checkout start command is transmitted from the checkout terminal 10 to the monitoring device 50 via the signal cable 60. That is, if a customer coming to the checkout area stands in the front of the checkout terminal 10 not in use and touches the start key displayed on the touch panel 11, the checkout start command is input to the monitoring device 50 connected to the checkout terminal 10.

If the checkout start command is received via the checkout terminal interface 55 in ACT 1, the processor 51 proceeds to ACT 2. In ACT 2, the processor 51 initializes the first memory 521 and the second memory 522. The data stored in the first memory 521 and the second memory 522 are cleared by the initialization.

If finishing initializing the first memory 521 and the second memory 522, the processor 51 proceeds to ACT 3. In ACT 3, the processor 51 outputs a start signal to the camera 80 connected to the camera interface 54. The camera 80 starts an imaging action according to the start signal. As explained above, the camera 80 is installed at a position where the camera 80 is capable of imaging the customer standing in the front of the checkout terminal 10 from above. Therefore, it is highly likely that the hair, the face, the clothes, and the like of the customer who has touched the start key are shown in the image captured by the camera 80.

In ACT 4, the processor 51 acquires, as the image acquiring unit 511, a captured image of each frame from the camera 80 via the camera interface 54. The processor 51 executes processing in ACT 5 and subsequent acts based on the captured image.

In ACT 5, the processor 51 executes skeleton estimation processing on the captured image. If the customer is shown in the captured image, the skeleton information of the customer is extracted by the skeleton estimation processing. That is, if the skeleton information is extracted, it is determined that the customer is standing in the front of the checkout terminal 10.

In ACT 6, the processor 51 checks whether the customer is detected, that is, whether the skeleton information is successfully extracted from the captured image. If the skeleton information is not successfully extracted from the captured image in ACT 6, the processor 51 proceeds to ACT 7. In ACT 7, the processor 51 checks whether data is stored in the second memory 522. Immediately after the second memory 522 is initialized in ACT 2, data is not stored in the second memory 522. In that case, the processor 51 returns to ACT 4. The processor 51 acquires the next captured image from the camera 80 and executes the processing in ACT 5 and subsequent acts in the same manner as explained above.

If the skeleton information is successfully extracted from the captured image in ACT 6, the processor 51 proceeds to ACT 8. In ACT 8, the processor 51 stores, as the storing unit 514, the skeleton information in the first memory 521. In ACT 9, the processor 51 checks whether another kind of skeleton information is already stored in the first memory 521. Immediately after the first memory 521 is initialized in ACT 2, another kind of skeleton information is not stored in the first memory 521. In that case, the processor 51 proceeds to ACT 15. Processing in ACT 15 is explained below.

If another kind of skeleton information is already stored in the first memory 521 in ACT 9, the processor 51 proceeds to ACT 10. In ACT 10, the processor 51 executes same-customer determination processing. Specifically, the processor 51 determines whether the customer shown in the captured image from which the skeleton information is extracted in ACT 5 is the same as the customer shown in the captured image stored in the memory 521 from which the skeleton information is extracted. For example, if a plurality of pieces of skeleton information are stored in the first memory 521, the processor 51 estimates, with extrapolation, present skeleton information from the plurality of pieces of skeleton information. The processor 51 performs matching of the estimated skeleton information and the skeleton information extracted in ACT 5. As a result, if a similarity degree of the skeleton information is equal to or larger than a predetermined value, the processor 51 determines that the same customer is shown. If the similarity degree of the skeleton information is smaller than the predetermined value, the processor 51 determines that the same customer is not shown.

Usually, a customer who performs registration and checkout processing and payment for the purchased commodities using the checkout terminal 10 places the purchased commodities on the first commodity placing table 102 and stands in front of the checkout terminal 10. The customer touches the start key displayed on the checkout start screen. Then, the screen of the touch panel 11 shifts from the checkout start screen to the registration details screen. Therefore, the customer starts registration processing for the purchased commodities. Specifically, the customer repeats a series of actions including: taking one of the purchased commodities from the first commodity placing table 102, causing the scanner 14 or the hand scanner 15 to read the barcode attached to the purchased commodity, and placing the purchased commodity on the second commodity placing table 103. Therefore, it is assumed that the customer keeps standing in the front of the checkout terminal 10 while the customer performs the registration processing for the purchased commodities. During that period, the customer is imaged by the camera 80. Accordingly, usually, it is determined in ACT 11 that the same customer is shown. However, it is also possible that, because of an unintended movement or the like of the customer or another customer in the checkout area, the processor 51 temporarily determines that the same customer is not shown. If it is determined by the processor 51 that the same customer is not shown, the processor 51 proceeds to ACT 15. Processing in ACT 15 is explained below.

If determining in ACT 11 that the same customer is shown, the processor 51 proceeds to ACT 12. In ACT 12, the processor 51 calculates, as the score calculating unit 513, a posture score from the skeleton information extracted in ACT 5. In ACT 13, the processor 51 checks whether the calculated posture score is a maximum value up to that point.

In ACT 14 explained below, the processor 51 stores in the second memory 522 the maximum value of the posture score. Therefore, in ACT 13, if the posture score is not stored in the second memory 522 or if the posture score calculated in ACT 12 is larger than the posture score stored in the second memory 522, the processor 51 determines that the posture score having the maximum value is calculated. If the posture score stored in the second memory 522 is smaller than or equal to the posture score calculated in ACT 12, the processor 51 determines that the posture score not having the maximum value is calculated. If the posture score not having the maximum value is calculated, the processor 51 proceeds to ACT 15. Processing in ACT 15 is explained below.

If the posture score having the maximum value is calculated in ACT 13, the processor 51 proceeds to ACT 14. In ACT 14, as the storing unit 514, the processor 51 stores in the second memory 522 the image data acquired in ACT 4 and the posture score calculated in ACT 12 in correlation with each other. Thereafter, the processor 51 proceeds to ACT 15.

In this way, if the processor 51 stores in the second memory 522 the image data and the posture score having the maximum value at that point in time in ACT 14, if the processor 51 determines in ACT 11, with the same-customer determination processing, that the same customer is not shown, or if another kind of skeleton information is not stored in the first memory 521 in ACT 9, the processor 51 proceeds to ACT 15.

In ACT 15, the processor 51 determines whether a checkout end command is received. If the checkout screen is displayed by the checkout terminal 10 corresponding to the monitoring device 50, the checkout end command is transmitted from the checkout terminal 10 to the monitoring device 50 via the signal cable 60. That is, if the customer who finished the registration processing for the purchased commodities touches the payment key displayed on the registration details screen, the screen of the touch panel 11 shifts from the registration details screen to the payment method selection screen. Therefore, the customer touches a key corresponding to a desired payment method. Then, the screen of the touch panel 11 shifts to a checkout screen corresponding to the payment method and the checkout end command is input to the monitoring device 50.

If the checkout end command is not received in ACT 15, that is, if the customer continues the registration processing for the purchased commodities, the processor 51 returns to ACT 4. The processor 51 acquires the next captured image from the camera 80 and executes the processing in ACT 5 and subsequent acts in the same manner as explained above. That is, every time the processor 51 acquires a captured image in which the hair, the face, the clothes, and the like of the customer continuing the registration processing for the purchased commodities are highly likely to be shown, the processor 51 executes the skeleton estimation processing in ACT 5, the skeleton information storage processing in ACT 8, the same-customer determination processing in ACT 10, the posture score calculation processing in ACT 12, and the second memory update processing in ACT 14.

If the checkout end command is received in ACT 15, the processor 51 proceeds to ACT 17. In ACT 17, the processor 51 outputs a stop signal to the camera 80 connected to the camera interface 54. The camera 80 stops the imaging operation according to the stop signal. Then, the processor 51 ends the procedure illustrated in the flowchart of FIG. 6. Thereafter, the processor 51 waits for the next checkout start command in ACT 1 again.

If the customer performs registration and checkout processing and payment for the purchased commodities by himself or herself using the checkout terminal 10 in this way, usually, the customer keeps standing in the front of the checkout terminal 10 until the checkout processing ends. Therefore, since the skeleton information of the customer is continuously extracted from the image of each frame captured by the camera 80, the processor 51 repeatedly executes the processing in ACT 8 to ACT 14 on the captured image. As a result, a captured image in which the posture score is the maximum value is stored in the second memory 522.

If the customer performs operation for paying a price of the purchased commodities on the checkout terminal 10 and the checkout processing ends, the processor 51 ends the information processing shown in FIG. 6. The processor 51 clears the second memory 522 according to a touch on the start key by the next customer. Therefore, the image information of the customer who has ended the checkout processing does not remain in the second memory 522.

On the other hand, if the customer went away from the front of the checkout terminal 10 before the checkout processing has ended, the skeleton information cannot be extracted from the captured image in the skeleton estimation processing in ACT 5. If the skeleton information cannot be extracted from the captured image in a state in which the captured image in which the posture score is the maximum value is stored in the second memory 522, the processor 51 proceeds to ACT 16. In ACT 16, the processor 51 outputs an alert with as the output unit 515. Specifically, the processor 51 outputs an alert signal to the attendant terminal 40 via the attendant terminal interface 56. The alert signal includes the data of the captured image in the frame unit stored in the second memory 522.

The processor 51 that has output the alert proceeds to ACT 17 explained above. That is, the processor 51 outputs a stop signal to the camera 80 connected to the camera interface 54 and ends the information processing shown in FIG. 6.

In this way, if the customer goes away from the front of the checkout terminal 10 before the checkout processing ends, the alert signal is output from the monitoring device 50 to the attendant terminal 40. In the attendant terminal 40, an alert screen 90 (see FIG. 7) is displayed on the display device according to the alert signal.

Figure 7:
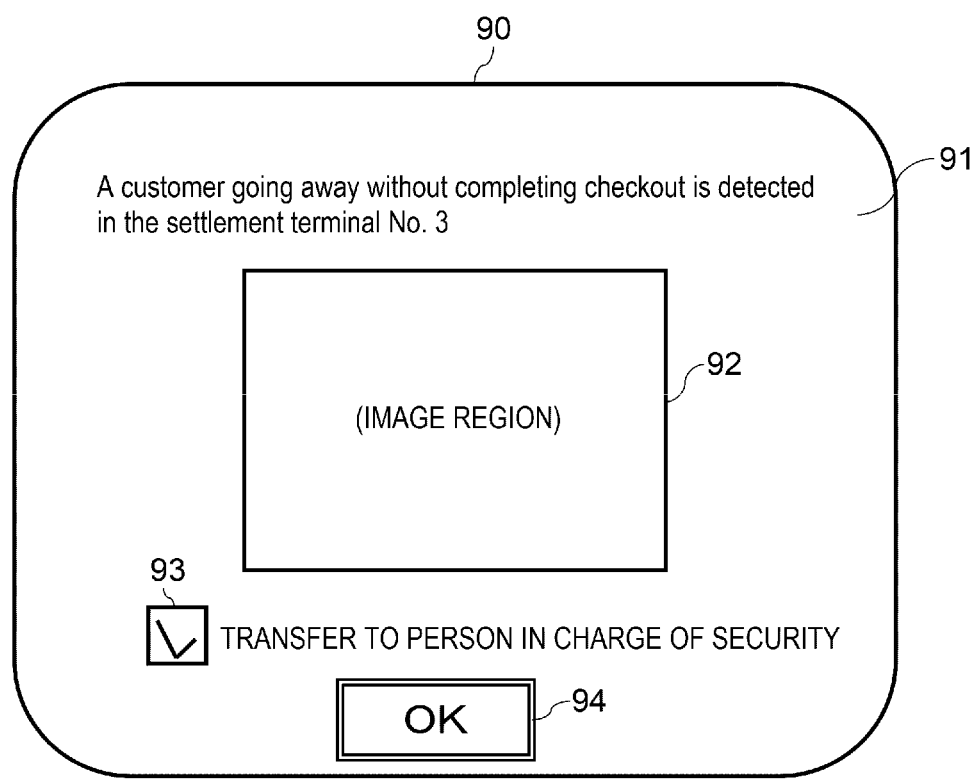
FIG. 7 is an example of an alert screen.

FIG. 7 is an example of the alert screen 90. As illustrated in FIG. 7, on the alert screen 90, a captured image is displayed in an image region 92 together with an alert message 91. The alert message 91 notifies the attendant that the customer went away without completing the checkout processing with the checkout terminal 10 corresponding to the monitoring device 50, which is the alert signal transmission source. The captured image is received together with the alert signal, that is, the captured image in which the posture score is the largest. On the alert screen 90, a checkbox 93 that is checked if information of the alert screen 90 is to be transferred to a person in charge of security other than the attendant and an OK button 94 are also displayed. A layout, an image, text, and the like of the alert screen 90 are not limited to those illustrated in FIG. 7.

The attendant who checks the alert screen 90 can learn that a customer performing checkout processing using the checkout terminal 10 of No. 3 left the checkout terminal 10 without completing the checkout processing. At this time, an image showing features such as the head, the face, and the clothes of the customer is displayed in the image region 92. Therefore, the attendant can easily specify, from the image, who is an alert notification target customer.

For example, the attendant who specifies the alert notification target customer touches the OK button 94. Then, the alert screen 90 is erased. For example, the attendant who does not successfully specify the alert notification target customer checks the checkbox 93 and then touches the OK button 94. Then, content of the alert screen 90 is transferred from the attendant terminal 40 to a predetermined terminal operated by the person in charge of security. As a result, the image showing the features of the customer who left the checkout area without completing checkout processing is displayed and stored in the predetermined terminal.

As explained in detail above, according to the first embodiment, even if there are a plurality of customers who are about to go away from the checkout area when the alert is notified from the attendant terminal 40, the attendant can easily specify an alert target customer. As a result, it is possible to prevent, at a high probability, the customer from going away from the checkout area without completing checkout processing.

Additionally, the monitoring device 50 stores, in the second memory 522, only a frame image in which a posture score is the largest. Therefore, it is unnecessary to store a plurality of image data having large data sizes, which reduces a storage requirement for the monitoring device 50.

Second Embodiment

A second embodiment is explained with reference to FIGS. 8 to 10.

In the second embodiment, as in the first embodiment, the monitoring devices 50 connected to the corresponding checkout terminals 10 in the checkout system 100 operate as customer monitoring devices. Accordingly, FIGS. 1 to 3 are applicable to the second embodiment as well, and the explanations for FIGS. 1 to 3 are omitted. FIGS. 8 to 10 correspond to FIGS. 4 to 6 in the first embodiment. Therefore, the same components as the first embodiment are denoted by the same reference numerals and signs and the detailed explanations of the components are omitted.

The monitoring device 50 is partly different from the monitoring device 50 in the first embodiment in its configuration and functions. Therefore, in the following explanation, a monitoring device according to the second embodiment is referred to as a monitoring device 501.

Figure 8:
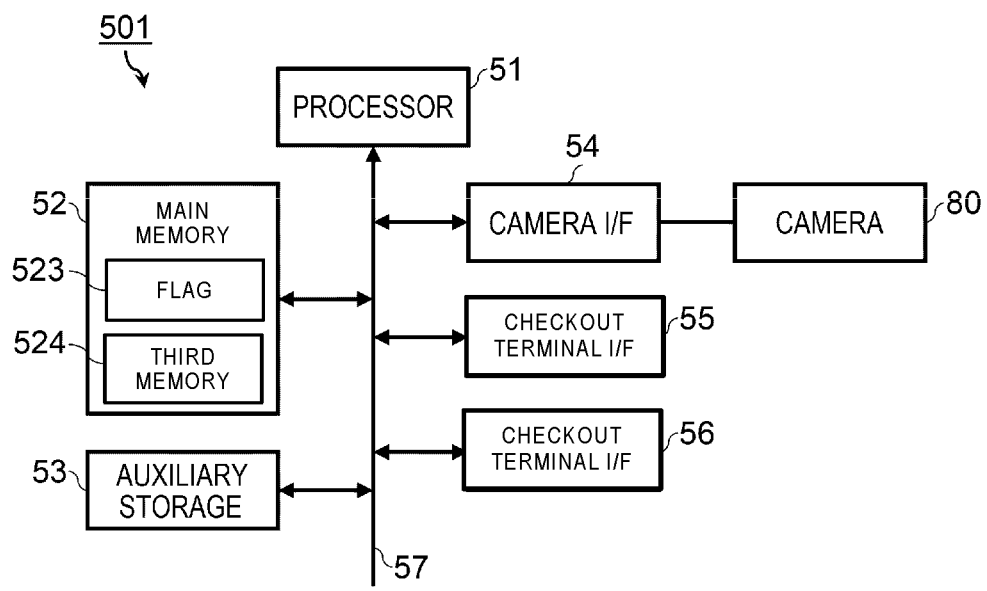
FIG. 8 is a hardware block diagram of a monitoring device according to a second embodiment.

FIG. 8 is a hardware block diagram of the monitoring device 501. Like the monitoring device 50, the monitoring device 501 includes the processor 51, the main memory 52, the auxiliary storage device 53, the camera interface (I/F) 54, the checkout terminal interface (I/F) 55, the attendant terminal interface (I/F) 56, and the system transmission line 57.

However, the monitoring device 501 uses a part of the volatile memory region in the main memory 52 as a region of a memory 523 for a detection completion flag "F" and a third memory 524. The memory 523 for the detection completion flag F and the third memory 524 are explained below.

Figure 9:
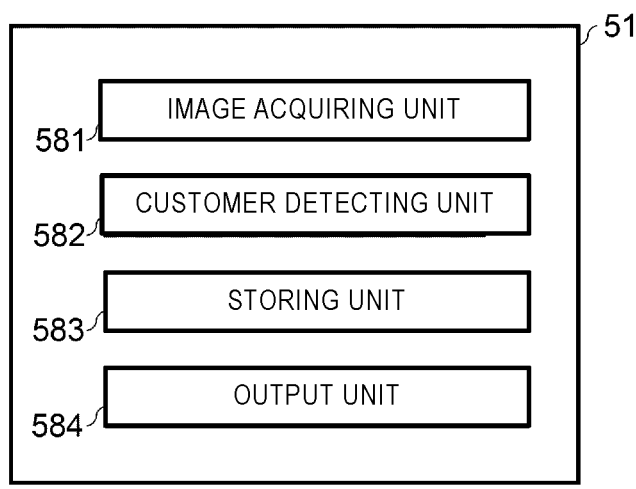
FIG. 9 is a functional block diagram of a monitoring device according to a second embodiment.

In the monitoring device 501, as illustrated in FIG. 9, the processor 51 operates as an image acquiring unit 581, a customer detecting unit 582, a storing unit 583, and an output unit 584.

Like the image acquiring unit 511 of the monitoring device 50, the image acquiring unit 581 performs the function of sequentially acquiring, for each of frames, image data captured by the camera 80 connected via the camera interface 54.

Like the customer detecting unit 512 of the monitoring device 50, the customer detecting unit 582 performs the function of detecting a customer who is performing checkout processing using the checkout terminal 10. The customer detecting unit 582 detects the customer based on, for example, an image captured by the camera 80 and acquired by the image acquiring unit 581. However, since the monitoring device 501 does not have the function of the score calculating unit 513, the customer detecting unit 582 does not need to use the skeleton estimation technique. For example, the customer detecting unit 582 can detect, from the captured image, as the customer, an object belonging to a person category using an object detection technique in which deep learning is used, such as single-shot detector (SSD).

The storing unit 583 performs a function of storing in the memory 523 the detection completion flag F, which is one-bit data of "0" or "1". The storing unit 583 also performs a function of storing in the third memory 524 data of a captured image in which the customer was detected first by the customer detecting unit 582.

As explained below, in the second embodiment as well, if a checkout start command is received from the checkout terminal 10, the processor 51 outputs a start signal to the camera 80. The customer touches the start key displayed on the checkout start screen displayed on the touch panel 11 of the checkout terminal 10, whereby the checkout start command is transmitted from the checkout terminal 10 to the monitoring device 501. Therefore, it is highly likely that the customer facing the touch panel 11 is shown in an image captured by the camera 80 at that timing. That is, since the camera 80 is disposed above the checkout terminal 10, it is highly likely that not only the clothes of the customer but also the face of the customer is shown. Since all of purchased commodities of the customer are placed on the first commodity placing table 102, the purchased commodities should be shown in the captured image. Therefore, the data of the captured image stored in the third memory 524, that is, the captured image in which the customer was detected first by the customer detecting unit 582 can be considered as information representing features of the customer. In other words, the storing unit 583 can acquire the information representing the features of the customer.

Like the output unit 515 of the monitoring device 50, the output unit 584 performs the function of outputting an alert signal if the customer is no longer detected by the customer detecting unit 582 before checkout processing ends. The alert signal includes the data of the captured image, which is the information stored in the third memory 524, that is, the information representing the features of the customer. For example, the alert signal is output to the attendant terminal 40 via the signal cable 70.

All of the functions of the image acquiring unit 581, the customer detecting unit 582, the storing unit 583, and the output unit 584 explained above are performed by the processor 51 according to a customer monitoring program.

Figure 10:
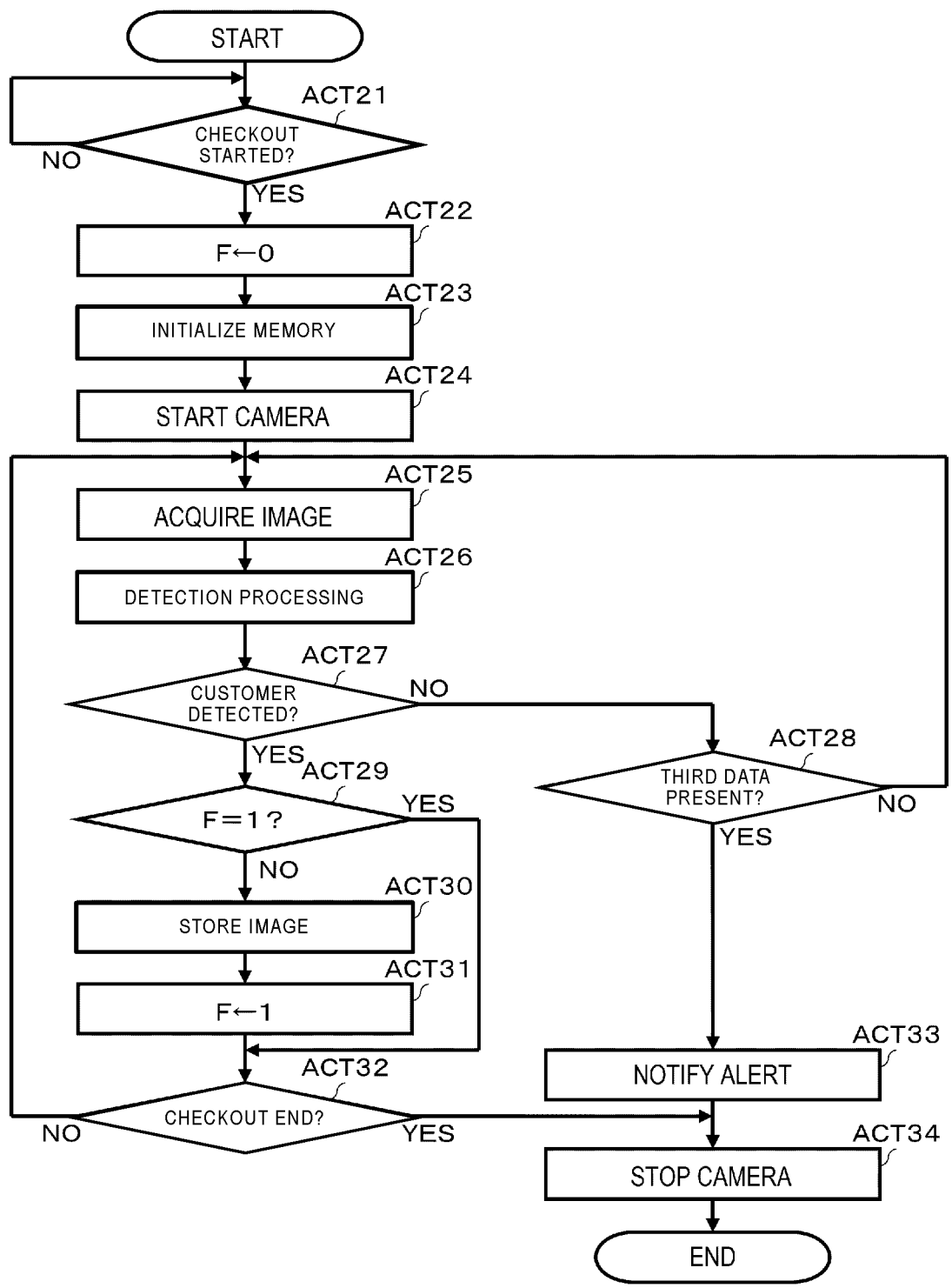
FIG. 10 is a flowchart of information processing executed by a monitoring device according to a second embodiment.

FIG. 10 is a flowchart of the information processing executed by the processor 51 of the monitoring device 501 according to the customer monitoring program. A main procedure performed by the monitoring device 501 is explained below with reference to FIG. 10. The procedure explained below is an example. The procedure can be changed as appropriate if the same effects can be achieved.

As illustrated in FIG. 10, in ACT 21, the processor 51 waits for a checkout start command. If the start key displayed on the checkout start screen of the checkout terminal 10 corresponding to the monitoring device 501 is touched, whereby the checkout start command is received via the checkout terminal interface 55, the processor 51 proceeds to ACT 22. In ACT 22, the processor 51 sets the detection completion flag F stored in the memory 523 to "0" as the storing unit 583. In ACT 23, the processor 51 initializes the third memory 524. The data stored in the third memory 524 is cleared by the initialization.

If finishing initializing the third memory 524, the processor 51 proceeds to ACT 24. In ACT 24, the processor 51 outputs a start signal to the camera 80 connected to the camera interface 54. The camera 80 starts an imaging operation according to the start signal.

In ACT 25, the processor 51 acquires a captured image of each frame from the camera 80 via the camera interface 54 as the image acquiring unit 581. The processor 51 executes processing in ACT 26 and subsequent acts based on the captured image.

In ACT 26, the processor 51 performs object detection processing to detect an object belonging to a person category from the captured image.

In ACT 27, the processor 51 checks whether an object belonging to the person category is successfully detected from the captured image. If an object belonging to the person category is not successfully detected from the captured image in ACT 27, the processor 51 proceeds to ACT 28. In ACT 28, the processor 51 checks whether data is stored in the third memory 524. No data is stored in the third memory 524 immediately after the third memory 524 is initialized in ACT 23. In that case, the processor 51 returns to ACT 25. The processor 51 acquires the next captured image from the camera 80 and executes the processing in ACT 26 and subsequent acts in the same manner as explained above.

If an object belonging to the person category is successfully detected from the captured image in ACT 27, the processor 51 proceeds to ACT 29. In ACT 29, the processor 51 checks the detection completion flag F of the memory 523. If the detection completion flag F is "0", the processor 51 proceeds to ACT 30. In ACT 30, as the storing unit 583, the processor 51 stores in the third memory 524 data of the captured image acquired in ACT 25. In ACT 31, the processor 51 rewrites the detection completion flag F of the memory 523 from "0" to "1" as the storing unit 583. Thereafter, the processor 51 proceeds to ACT 32.

In ACT 32, the processor 51 checks whether a checkout end command is received. If the checkout end command is not received, that is, if the customer continues the registration processing for the purchased commodities, the processor 51 returns to ACT 25. The processor 51 acquires the next captured image from the camera 80 and executes the processing in ACT 26 and subsequent acts. However, in this case, since the detection completion flag F is "1" in ACT 29, the processor 51 skips the processing in ACT 30 and ACT 31.

If receiving the checkout end command in ACT 32, the processor 51 proceeds to ACT 34. In ACT 34, the processor 51 outputs a stop signal to the camera 80 connected to the camera interface 54. The camera 80 stops the imaging operation according to the stop signal. Then, the processor 51 ends the information processing indicated by the flowchart of FIG. 10. Thereafter, in ACT 21, the processor 51 waits for the next checkout start command again.

If the customer performs registration and checkout processing and payment for the purchased commodities by himself or herself using the checkout terminal 10 in this way, usually, the customer keeps standing in the front of the checkout terminal 10 until the checkout processing ends. Therefore, since an object belonging to the person category is continuously detected from an image of each frame captured by the camera 80, the processor 51 repeatedly executes the processing in ACT 29 and subsequent acts on the captured image. As a result, a captured image in which the person, who is the customer, was detected first is stored in the third memory 524.

If the customer performs operation for paying a price of the purchased commodities on the checkout terminal 10 and the checkout processing ends, the processor 51 ends the information processing shown in FIG. 10. The processor 51 clears the third memory 524 according to a touch operation on the start key by the next customer. Therefore, the image information of the customer who ended the checkout processing does not remain in the third memory 524.

On the other hand, if the customer went away from the front of the checkout terminal 10 before the checkout processing ends, any customer cannot be detected from the captured image in the detection processing in ACT 26. If the customer is no longer detected after the captured image in which the customer was detected first is stored in the third memory 524, the processor 51 proceeds to ACT 33. In ACT 33, the processor 51 outputs an alert as the output unit 584. Specifically, the processor 51 outputs an alert signal to the attendant terminal 40 via the attendant terminal interface 56. The alert signal includes the data of the captured image stored in the third memory 524.

The processor 51 that has output the alert proceeds to ACT 34 explained above. That is, the processor 51 outputs a stop signal to the camera 80 connected to the camera interface 54 and ends the information processing shown in FIG. 10.

In this way, if the customer goes away from the front of the checkout terminal 10 before the checkout processing ends, the alert signal is output from the monitoring device 50 to the attendant terminal 40. In the attendant terminal 40, an alert screen is displayed on the display device according to the alert signal. The alert screen is, for example, a screen having the same layout as the alert screen 90 in the first embodiment. Therefore, a captured image at a point in time when the customer who went away from the checkout terminal 10 touched the start key displayed on the checkout start screen is displayed on the alert screen.

It is highly likely that not only the clothes of the customer but also the face of the customer is shown in the captured image. Therefore, the attendant can easily specify, from the image, who is an alert notification target customer.

As explained above in detail, in the second embodiment, as in the first embodiment, it is possible to prevent, at a high probability, the customer from going away from the checkout area without completing checkout.

Moreover, in the second embodiment, the skeleton estimation processing and the calculation processing for the posture score are unnecessary. Therefore, a processing load on the processor 51 can be reduced.

Third Embodiment

A third embodiment is explained with reference to FIGS. 11 to 13.

In the third embodiment, as in the first and second embodiments, the monitoring devices 50 connected to the corresponding checkout terminals 10 in the checkout system 100 operates as customer monitoring devices. Accordingly, FIGS. 1 to 3 are applicable to the third embodiment as well, and the explanations for FIGS. 1 to 3 are omitted. FIGS. 11 to 13 correspond to FIGS. 4 to 6 in the first embodiment. Therefore, the same components as the first embodiment are denoted by the same reference numerals and signs and detailed explanations of the components are omitted.

The monitoring device 50 is partly different from the monitoring device 50 in the first and second embodiments in its configuration and functions. Therefore, in the following explanation, a monitoring device according to the third embodiment is referred to as a monitoring device 502.

Figure 11:
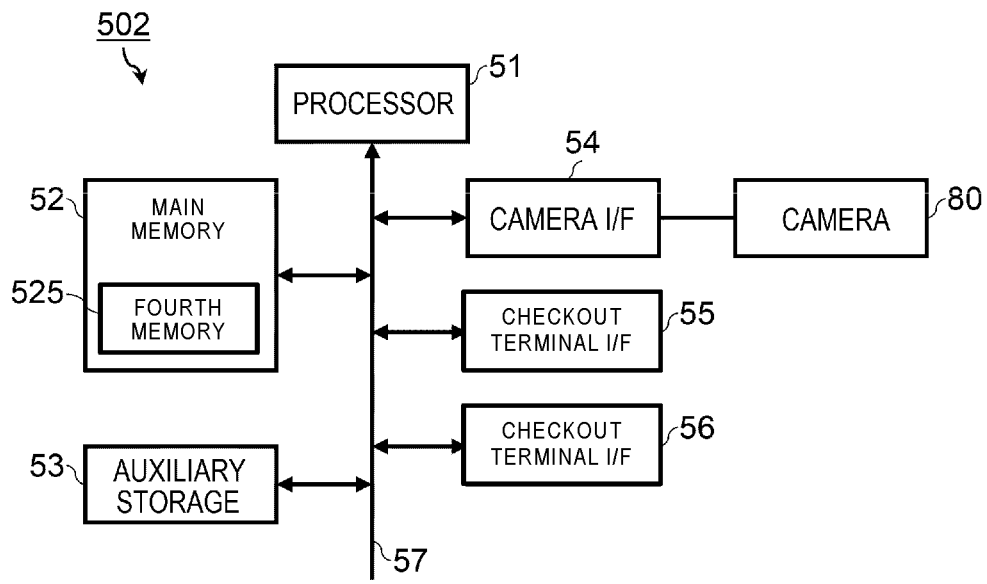
FIG. 11 is a hardware block diagram of a monitoring device according to a third embodiment.

FIG. 11 is a hardware block diagram of the monitoring device 502. Like the monitoring device 50 and the monitoring device 501, the monitoring device 502 includes the processor 51, the main memory 52, the auxiliary storage device 53, the camera interface (I/F) 54, the checkout terminal interface (I/F) 55, the attendant terminal interface (I/F) 56, and the system transmission line 57.

However, the monitoring device 502 uses a part of the volatile memory region in the main memory 52 as a region of a fourth memory 525. The fourth memory 525 is explained below.

Figure 12:
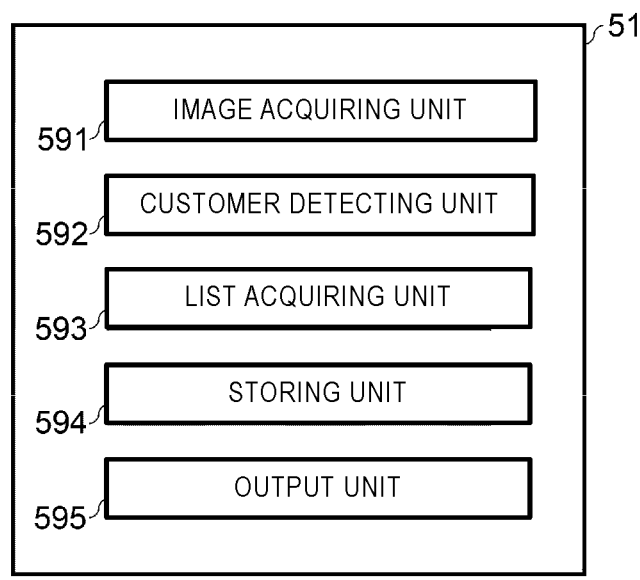
FIG. 12 is a functional block diagram of a monitoring device according to a third embodiment.

In the monitoring device 502, as illustrated in FIG. 12, the processor 51 operates as an image acquiring unit 591, a customer detecting unit 592, a list acquiring unit 593, a storing unit 594, and an output unit 595.

Like the image acquiring unit 511 of the monitoring device 50, the image acquiring unit 591 performs the function of sequentially acquiring, for each of frames, image data captured by the camera 80 connected via the camera interface 54.

Like the customer detecting unit 512 of the monitoring device 50, the customer detecting unit 592 performs the function of detecting a customer who is performing checkout processing using the checkout terminal 10. The customer detecting unit 592 detects the customer based on, for example, an image captured by the camera 80 and acquired by the image acquiring unit 591. However, since the monitoring device 502 does not have the function of the score calculating unit 513, the customer detecting unit 592 does not need to use the skeleton estimation technique. For example, the customer detecting unit 592 can detect, from the captured image, as the customer, an object belonging to a person category using an object detection technique in which deep learning is used, such as SSD.

The list acquiring unit 593 performs a function of acquiring a list of commodities registered as information concerning a transaction performed by the checkout terminal 10. In the checkout terminal 10, for example, if information for identifying a commodity is read by the scanner 14 or the hand scanner 15, purchased commodity data including a commodity name and a price of the commodity is registered in a transaction memory. According to this registration processing, commodity names, prices, and the like of purchased commodities by the customer are sequentially stored in the transaction memory. The list acquiring unit 593 acquires, as list data of the purchased commodities, the data stored in the transaction memory of the checkout terminal 10.

The storing unit 594 performs a function of storing in the fourth memory 525 the list data of the purchased commodities acquired by the list acquiring unit 593.

The list data of the purchased commodities indicates a list of commodities purchased by the customer who performs checkout processing using the checkout terminal 10. Therefore, the list data can be used as information representing features of the customer. Thus, the list acquiring unit 593 can acquire the information representing the features of the customer.

Like the output unit 515 of the monitoring device 50, the output unit 595 performs the function of outputting an alert signal if the customer is no longer detected by the customer detecting unit 592 before checkout processing ends. The alert signal includes the list data of the purchased commodities, which is the information stored in the fourth memory 525, that is, the information representing the features of the customer. For example, the alert signal is output to the attendant terminal 40 via the signal cable 70.

All of the functions of the image acquiring unit 591, the customer detecting unit 592, the list acquiring unit 593, the storing unit 594, and the output unit 595 explained above are performed by the processor 51 according to a customer monitoring program.

Figure 13:
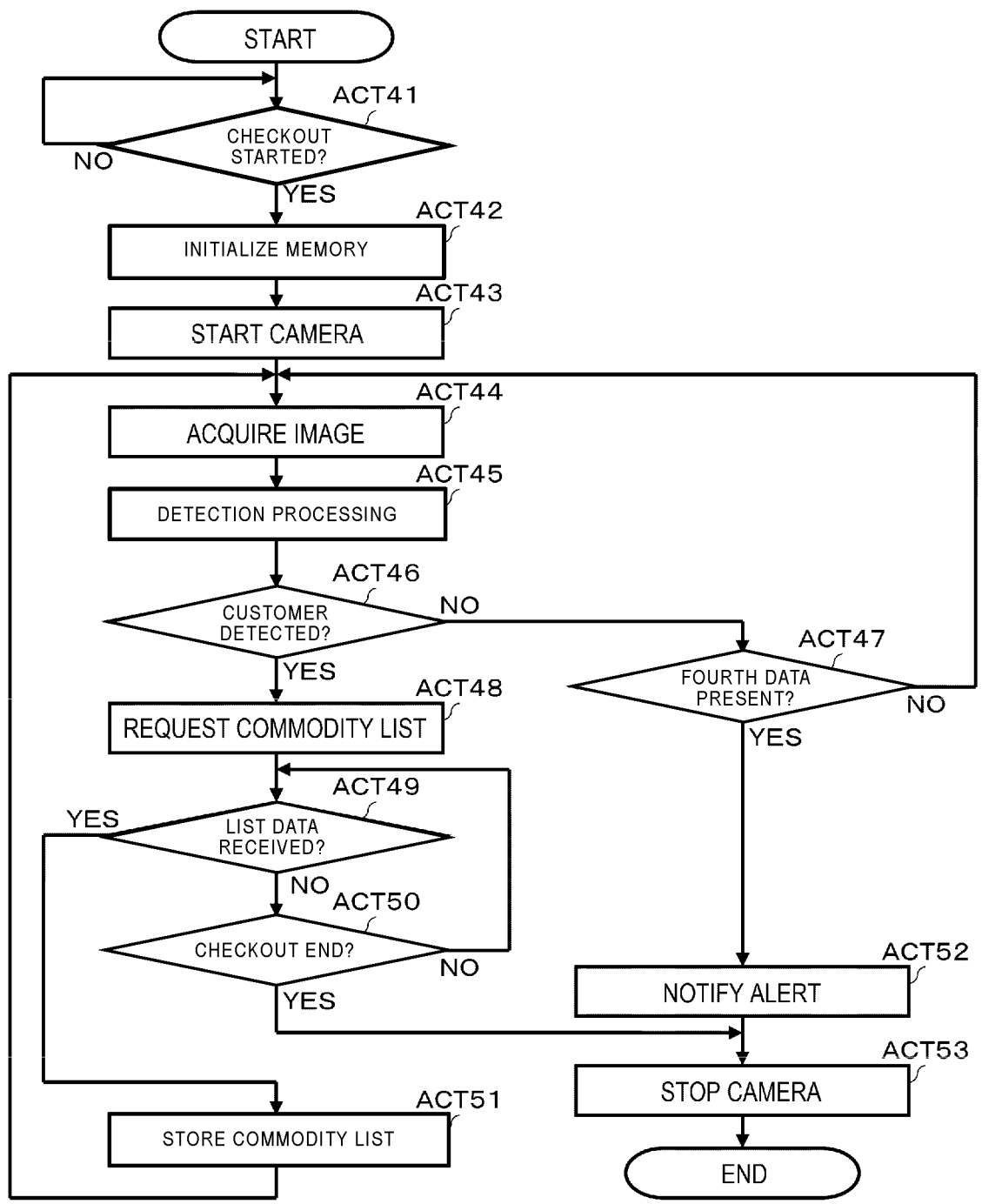
FIG. 13 is a flowchart of information processing executed by a monitoring device according to a third embodiment.

FIG. 13 is a flowchart of the information processing executed by the processor 51 of the monitoring device 502 according to the customer monitoring program. A main procedure performed by the monitoring device 502 is explained below with reference to FIG. 13. The procedure explained below is an example. The procedure can be changed as appropriate if the same effects can be achieved.

As illustrated in FIG. 13, in ACT 41, the processor 51 waits for a checkout start command. In the checkout terminal 10 corresponding to the monitoring device 502, if the start key displayed on the checkout start screen is touched, whereby a checkout start command is received via the checkout terminal interface 55, the processor 51 proceeds to ACT 42. In ACT 42, the processor 51 initializes the fourth memory 525. The data stored in the fourth memory 525 is cleared by the initialization.

If finishing initializing the fourth memory 525, the processor 51 proceeds to ACT 43. In ACT 43, the processor 51 outputs a start signal to the camera 80 connected to the camera interface 54. The camera 80 starts an imaging operation according to the start signal.

In ACT 44, the processor 51 acquires a captured image of each frame from the camera 80 via the camera interface 54 as the image acquiring unit 591. The processor 51 executes processing in ACT 45 and subsequent acts based on the captured image in the frame unit.

In ACT 45, the processor 51 performs object detection processing to detect an object belonging to a person category from the captured image.

In ACT 46, the processor 51 checks whether an object belonging to the person category is successfully detected from the captured image. If an object belonging to the person category is not successfully detected from the captured image in ACT 46, the processor 51 proceeds to ACT 47. In ACT 47, the processor 51 checks whether data is stored in the fourth memory 525. No data is stored in the fourth memory 525 immediately after the fourth memory 525 is initialized in ACT 42. In that case, the processor 51 returns to ACT 44. The processor 51 acquires the next captured image from the camera 80 and executes the processing in ACT 45 and subsequent acts in the same manner as explained above.

If an object belonging to the person category is successfully detected from the captured image in ACT 46, the processor 51 proceeds to ACT 48. In ACT 48, the processor 51 issues a request command for list data from the checkout terminal interface 55 as the list acquiring unit 593. The request command is received by the checkout terminal 10 connected via the signal cable 60. The processor 181 of the checkout terminal 10 that has received the request command transmits, as a response to the request, list data of purchased commodities stored in the transaction memory to the monitoring device 502, which is the request command transmission source. If any one of payment methods is selected on the payment method selection screen, the processor 181 issues a checkout end command.

The processor 51 of the monitoring device 502 that has transmitted the request command waits for the list data to be received in ACT 49 or the checkout end command to be received in ACT 50. If the list data is received in the waiting state in ACT 49 and ACT 50, the processor 51 proceeds to ACT 51. In ACT 51, as the storing unit 594, the processor 51 stores in the fourth memory 525 the list data.

Thereafter, the processor 51 returns to ACT 44. The processor 51 acquires the next captured image from the camera 80 and executes the processing in ACT 45 and subsequent acts.

If the checkout end command is received in the waiting state in ACT 49 and ACT 50, the processor 51 proceeds to ACT 53. In ACT 53, the processor 51 outputs a stop signal to the camera 80 connected to the camera interface 54. The camera 80 stops the imaging operation according to the stop signal. Then, the processor 51 ends the procedure illustrated in the flowchart of FIG. 13. Thereafter, in ACT 41, the processor 51 waits for the next checkout start command again.

If the customer performs registration and checkout processing for the purchased commodities by himself or herself using the checkout terminal 10 in this way, usually, the customer keeps standing in the front of the checkout terminal 10 until the checkout processing ends. Therefore, since an object belonging to the person category is continuously detected from an image of each from captured by the camera 80, the processor 51 repeatedly executes the processing in ACT 48 and subsequent acts on the captured image. As a result, list data of the purchased commodities registered using the checkout terminal 10 by the customer is stored in the fourth memory 525.

If the customer performs operation for paying a price of the purchased commodities on the checkout terminal 10 and the checkout processing ends, the processor 51 ends the information processing shown in FIG. 13. The processor 51 clears the fourth memory 525 according to a touch operation on the start key by the next customer. Therefore, the list data of the customer who has ended the checkout processing does not remain in the fourth memory 525.

On the other hand, if the customer goes away from the front of the checkout terminal 10 before the checkout processing ends, any customer cannot be detected from the captured image in the detection processing in ACT 45. If the customer is no longer detected from the captured image in a state in which the list data of the purchased commodities is stored in the fourth memory 525, the processor 51 proceeds to ACT 52. In ACT 52, the processor 51 outputs an alert as the output unit 595. Specifically, the processor 51 outputs an alert signal to the attendant terminal 40 via the attendant terminal interface 56. The alert signal includes the list data of the purchased commodities stored in the fourth memory 525.

The processor 51 that has output the alert proceeds to ACT 53 explained above. That is, the processor 51 outputs a stop signal to the camera 80 connected to the camera interface 54 and ends the information processing shown in FIG. 13.

In this way, if the customer goes away from the front of the checkout terminal 10 before the checkout processing ends, the alert signal is output from the monitoring device 50 to the attendant terminal 40. In the attendant terminal 40, an alert screen is displayed on the display device according to the alert signal. The alert screen is, for example, a screen having the same layout as the alert screen 90 in the first embodiment. On the alert screen 90, the list data of the purchased commodities is displayed in a region where the captured image is displayed. Therefore, the attendant can easily specify, from the list of the purchased commodities, who is the alert notification target customer.

As explained in detail above, in the third embodiment, as in the second embodiment, it is possible to prevent, at a high probability, the customer from going away from the checkout area without completing checkout processing.

Moreover, in the third embodiment, a memory for storing an image captured by the camera 80 until the checkout processing ends is unnecessary. Therefore, a required memory capacity can be reduced.

Modifications

The monitoring device 50 may not be provided to correspond to one checkout terminal 10. For example, one monitoring device 50 is allocated to two checkout terminals 10. The monitoring device 50 acquires image data from the cameras 80 connected to the checkout terminals 10 and executes the information processing shown in FIG. 6, 10, or 13 in parallel. Consequently, the number of monitoring devices 50 can be reduced compared with the number of checkout terminals 10. Therefore, there is an advantage that system cost can be reduced.

The checkout terminal 10 monitored by the monitoring device 50 is not limited to the checkout terminal 10 in the checkout system 100 of a self-service type. For example, there is a checkout system of a semi-self-service type in which a registration machine that performs registration processing for purchased commodities and a checkout machine that performs checkout processing for the purchased commodities are separated, a store clerk operates the registration machine, and a customer operates the checkout machine. The monitoring device 50, 501, or 502 can be applied to the checkout machine of such a checkout system as well. Consequently, it is possible to easily specify a person about to go away without completing checkout processing by the checkout machine.

The camera 80 may not be provided in each of the checkout terminals 10. For example, a plurality of customers who operate checkout terminals 10 may be simultaneously imaged by the camera 80 attached on the ceiling and the like of the checkout area. In the third embodiment, since the monitoring device can detect the customer, the camera 80 may be omitted. For example, the customer may be detected using a human sensor.

The embodiments are explained using an example in which one customer is imaged by the camera 80. However, a group of two or more customers stand in front of the checkout terminal 10 and perform checkout processing. In such a case, the monitoring device 50 calculates posture scores from an image in which those customers are detected and store image data of a maximum posture score in the second memory 522 for each customer. The monitoring device 501 and the monitoring device 502 can advance the subsequent processing by detecting at least one person.

The same-customer determination processing in ACT 10 in the first embodiment is not limited to the method of estimating skeleton information. For example, a captured image of each frame may be input to a CNN (Convolutional Neural Network) to calculate a feature vector of a customer and it may be determined, from distance information between the feature vector calculated this time and a feature vector of an immediately preceding customer, whether the customers are the same customer.

In the first embodiment, the data of the captured image in which the posture score is the maximum value is stored in the second memory 522. Concerning this point, data of a plurality of captured images in which posture scores are equal to or larger than a predetermined threshold may be stored in the second memory 522 and the plurality of image data may be transmitted at the time of an alert notification. Consequently, although the memory capacity of the monitoring device 50 increases, it is possible to more accurately specify a customer who goes away without completing checkout processing.

In the first embodiment, timing for initializing the first memory 521 and the second memory 522 is not limited to the timing of ACT 2. For example, the first memory 521 and the second memory 522 may be initialized after the processing in ACT 17. This point is the same in the second or third embodiment.

A notification destination of the alert is not limited to the attendant terminal 40. For example, the image data or the list data may be transmitted to an information terminal such as a smartphone or a tablet terminal carried by a store clerk together with the alert signal.

Timing when the checkout end command is output is not limited to the timing when the checkout screen is displayed. For example, the checkout end command may be output at timing when the checkout screen is displayed and a purchase receipt is dispensed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A monitoring device for monitoring a customer operating a checkout terminal to perform checkout processing in a store, the monitoring device comprising:
a memory including first and second memory regions;
an interface circuit connectable to the checkout terminal;
a camera interface through which an image captured by a camera is received, the camera being positioned so as to image the customer operating the checkout terminal; and
a processor configured to:
upon receipt of a first command indicating that the checkout processing has been started from the checkout terminal, initialize the first and second memory regions and begin monitoring the image captured by the camera,
repeatedly attempt to acquire skeleton information representing features of a customer shown in the image, and when the skeleton information is acquired, store the acquired skeleton information in the first memory region,
execute same-customer determination processing for determining whether the customer indicated by latest skeleton information that has been stored most recently in the first memory region is same as the customer indicated by previous skeleton information that was stored in the first memory region before the most recent skeleton information,
upon determining that the customer indicated by the most recent skeleton information is same as the customer indicated by the previous skeleton information:
calculate a posture score from the most recent skeleton information, and
store, in the second memory region, the calculated posture score in association with the image corresponding to the most recent skeleton information when no posture score is stored in the second memory region or when the calculated posture store is higher than another posture score that has been stored in the second memory region, and
upon detecting absence of the customer in the image after receiving the first command and before receiving a second command indicating that the checkout processing has been completed, control the interface circuit to output an alert signal and the image stored most recently in the second memory region.

2. The monitoring device according to claim 1, wherein the processor is configured to perform skeleton estimation processing on the image to calculate the posture score.

3. The monitoring device according to claim 2, wherein the posture score is higher when more body parts of the customer are recognized in the image through the skeleton estimation processing.

4. The monitoring device according to claim 1, wherein the processor is configured to override said another posture score and another image associated therewith stored in the second memory region with the calculated posture and the image associated therewith.

5. The monitoring device according to claim 1, wherein the processor is configured to perform object recognition on the image to recognize one or more commodities to be purchased by the customer during the monitoring.

6. The monitoring device according to claim 1, wherein the alert signal causes an external terminal to display an alert message including identification information of the checkout terminal and indicating that a customer left the checkout terminal before the checkout processing has been completed.

7. The monitoring device according to claim 1, wherein the camera is positioned above the checkout terminal.

8. The monitoring device according to claim 1, wherein the checkout terminal is a self-service type checkout terminal.

9. A monitoring method performed by a monitoring device for monitoring a customer operating a checkout terminal to perform checkout processing in a store, the monitoring method comprising:
receiving from the checkout terminal a first command indicating that checkout processing has been started from the checkout terminal;
initializing first and second memory regions and beginning monitoring an image captured by a camera positioned so as to image the customer operating the checkout terminal;
repeatedly attempting to acquire skeleton information representing features of a customer shown in the image, and when the skeleton information is acquired, storing the acquired skeleton information in the first memory region;
executing same-customer determination processing for determining whether the customer indicated by latest skeleton information that has been stored most recently in the first memory region is same as the customer indicated by previous skeleton information that was stored in the first memory region before the most recent skeleton information;
upon determining that the customer indicated by the most recent skeleton information is same as the customer indicated by the previous skeleton information:
calculating a posture score from the most recent skeleton information, and
storing, in the second memory region, the calculated posture score in association with the image corresponding to the most recent skeleton information when no posture score is stored in the second memory region or when the calculated posture store is higher than another posture score that has been stored in the second memory region; and
detecting absence of the customer in the image after receiving the first command and before receiving a second command indicating that the checkout processing has been completed, and outputting an alert signal and the image stored most recently in the second memory region.

10. The monitoring method according to claim 9, wherein calculating the posture score includes performing skeleton estimation processing on the image.

11. The monitoring method according to claim 10, wherein the posture score is higher when more body parts of the customer are recognized in the image through the skeleton estimation processing.

12. The monitoring method according to claim 9, wherein storing the calculated posture score includes overriding said another posture score and another image associated therewith with the calculated posture score and the image associated therewith.

13. The monitoring method according to claim 9, further comprising:
performing object recognition on the image to recognize one or more commodities to be purchased by the customer during the monitoring.

14. The monitoring method according to claim 9, wherein the alert signal causes an external terminal to display an alert message including identification information of the checkout terminal and indicating that a customer left the checkout terminal before the checkout processing has been completed.

15. The monitoring method according to claim 9, wherein the camera is positioned above the checkout terminal.

16. The monitoring method according to claim 9, wherein the checkout terminal is a self-service type checkout terminal.

17. A non-transitory computer readable medium storing a program causing a computer to execute a monitoring method for monitoring a customer operating a checkout terminal to perform checkout processing in a store, the monitoring method comprising:
- receiving from the checkout terminal a first command indicating that checkout processing has been started from the checkout terminal;
- initializing first and second memory regions and beginning monitoring an image captured by a camera positioned so as to image the customer operating the checkout terminal;
- repeatedly attempting to acquire skeleton information representing features of a customer shown in the image, and when the skeleton information is acquired, storing the acquired skeleton information in the first memory region;
- executing same-customer determination processing for determining whether the customer indicated by latest skeleton information that has been stored most recently in the first memory region is same as the customer indicated by previous skeleton information that was stored in the first memory region before the most recent skeleton information;
- upon determining that the customer indicated by the most recent skeleton information is same as the customer indicated by the previous skeleton information:
  - calculating a posture score from the most recent skeleton information, and
  - storing, in the second memory region, the calculated posture score in association with the image corresponding to the most recent skeleton information when no posture score is stored in the second memory region or when the calculated posture store is higher than another posture score that has been stored in the second memory region; and
- detecting absence of the customer in the image after receiving the first command and before receiving a second command indicating that the checkout processing has been completed, and outputting an alert signal and the image stored most recently in the second memory region.

18. The computer readable medium according to claim 17, wherein calculating the posture score includes performing skeleton estimation processing on the image.

19. The computer readable medium according to claim 18, wherein the posture score is higher when more body parts of the customer are recognized in the image through the skeleton estimation processing.

20. The computer readable medium according to claim 17, wherein storing the calculated posture score includes overriding said another posture score and another image associated therewith with the calculated posture score and the image associated therewith.

\* \* \* \* \*